United States Patent
Jahangir et al.

(10) Patent No.: US 10,791,496 B2
(45) Date of Patent: Sep. 29, 2020

(54) RESTORATION OF SERVING CALL SESSION CONTROL AND APPLICATION SERVER FUNCTION

(71) Applicant: T-Mobile USA, Inc., Bellevue, WA (US)

(72) Inventors: Zeeshan Jahangir, Bellevue, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 38 days.

(21) Appl. No.: 15/198,510

(22) Filed: Jun. 30, 2016

(65) Prior Publication Data

US 2018/0007612 A1 Jan. 4, 2018

(51) Int. Cl.
*H04L 1/00* (2006.01)
*H04W 40/28* (2009.01)
(Continued)

(52) U.S. Cl.
CPC .......... *H04W 40/28* (2013.01); *H04L 45/745* (2013.01); *H04L 61/203* (2013.01); *H04L 61/3085* (2013.01); *H04L 65/105* (2013.01); *H04L 65/1006* (2013.01); *H04L 65/1016* (2013.01); *H04L 65/1073* (2013.01); *H04L 67/20* (2013.01); *H04L 67/306* (2013.01); *H04W 8/005* (2013.01); *H04L 61/1511* (2013.01); *H04L 61/1588* (2013.01); *H04W 8/04* (2013.01);
(Continued)

(58) Field of Classification Search
CPC ......... H04L 29/06027; H04L 29/12188; H04L 45/34; H04L 61/1588; H04L 65/1016; H04L 65/1069; H04L 65/1073; H04L 69/40; H04W 4/00; H04W 12/06; H04W 48/08
See application file for complete search history.

(56) References Cited

U.S. PATENT DOCUMENTS

2006/0077926 A1 4/2006 Rune
2007/0207805 A1* 9/2007 Pallares Lopez .......... H04W 36/0033
455/436

(Continued)

OTHER PUBLICATIONS

3GPP TS 23.380 V13.2.0 (Mar. 2016).*
(Continued)

*Primary Examiner* — Abdelillah Elmejjarmi
(74) *Attorney, Agent, or Firm* — Lee & Hayes, P.C.

(57) ABSTRACT

A communication session for a UE can be restored in the event of serving call session control function (S-CSCF) node unavailability and/or application server (AS) unavailability by storing, prior to IMS unavailability, attribute-value pairs (AVPs) at a home subscriber server (HSS). These AVPs can be used independently by individual IMS nodes to restore a communication session for a UE due to an unavailable IMS node. When a first S-CSCF node becomes unavailable, a proxy CSCF (P-CSCF) node can send a SIP request originating from the UE to a second S-CSCF node. The second S-CSCF node can then send a request to the HSS for an identifier of an AS associated with the UE. Upon receipt of the AS identifier (e.g., an active AS name AVP) from the HSS, the second S-CSCF node can send the SIP request to the AS in order to restore the communication session for the UE.

20 Claims, 7 Drawing Sheets

(51) Int. Cl.
    *H04L 29/08*     (2006.01)
    *H04L 29/06*     (2006.01)
    *H04L 12/741*     (2013.01)
    *H04L 29/12*     (2006.01)
    *H04W 8/00*     (2009.01)
    *H04W 8/04*     (2009.01)
    *H04W 60/04*     (2009.01)
    *H04W 80/10*     (2009.01)
    *H04W 88/02*     (2009.01)

(52) U.S. Cl.
    CPC ............ *H04W 60/04* (2013.01); *H04W 80/10* (2013.01); *H04W 88/02* (2013.01)

(56) References Cited

U.S. PATENT DOCUMENTS

| | | | |
|---|---|---|---|
| 2008/0212569 A1* | 9/2008 | Terrill | H04L 29/12009 370/352 |
| 2009/0141625 A1 | 6/2009 | Ghai et al. | |
| 2009/0319641 A1* | 12/2009 | Verbandt | H04L 65/1016 709/220 |
| 2010/0062767 A1* | 3/2010 | Leis | H04L 69/40 455/435.1 |
| 2010/0154029 A1 | 6/2010 | Fernandez Alonso et al. | |
| 2011/0026460 A1 | 2/2011 | Lafuente Alvarez et al. | |
| 2011/0090903 A1* | 4/2011 | Jonsson | H04L 65/1073 370/352 |
| 2011/0258300 A1* | 10/2011 | Hao | H04L 65/1016 709/221 |
| 2012/0315904 A1* | 12/2012 | Tellinger | H04L 65/1016 455/435.1 |
| 2014/0301273 A1* | 10/2014 | Rameil-Green | H04L 67/1002 370/328 |
| 2015/0124588 A1* | 5/2015 | Hallenstal | H04L 65/1016 370/221 |
| 2015/0282242 A1* | 10/2015 | Merino Vazquez | H04L 65/1073 370/221 |
| 2016/0345284 A1* | 11/2016 | Yared | H04L 65/1016 |
| 2017/0093929 A1* | 3/2017 | Hockey | H04L 65/1006 |

OTHER PUBLICATIONS

ETSI TS 129 328 V10.3.0 (Jun. 2011).*
PCT Search Report and Written Opinion dated Sep. 1, 2017 for PCT Application No. PCT/US17/38592, 19 pages.
"3rd Generation Partnership Prokect: Technical Specification Group Core Network and Terminals; IMS Restoration Procedures (Release 11)", 3GPP Standard; 3GPP TS 23.380, 3rd Generation Partnership Project (3GPP), vol. CT WG4, No. V11.2.0, Dec. 12, 2013, pp. 1-17.
Extended European Search Report dated Oct. 15, 2019 for European Patent Application No. 17820954.0, 10 pages.

* cited by examiner

RESTORATION OF SERVING CALL SESSION CONTROL AND APPLICATION SERVER FUNCTION

BACKGROUND

Internet Protocol Multimedia Subsystem (IMS) is an architectural framework defined by the 3$^{rd}$ Generation Partnership Project (3GPP) for delivering Internet Protocol (IP) multimedia to user equipment (UE) of the IMS network. An IMS core network (sometimes referred to as the "IMS core", the "Core Network (CN)," or the "IM CN Subsystem") permits wireless and wireline devices to access IP multimedia, messaging, and voice applications and services. IMS allows for peer-to-peer communications, as well as client-to-server communications over an IP-based network.

During a registration procedure with the IMS core network, the UE is assigned a serving call session control function (S-CSCF) node and an application server (AS). These assigned nodes are tasked with serving the UE during a subsequent communication session, and all signaling originating from, and terminating at, the UE during the communication session is to be routed through the assigned nodes of the IMS core. However, it is possible for one or more of the assigned IMS nodes to become unavailable such that a communication session cannot be conducted using the now-unavailable node(s). For example, hardware and/or software of the assigned S-CSCF node and/or the assigned AS can malfunction or crash, rendering the IMS node inoperable.

When an assigned IMS node becomes unavailable during a communication session, after a brief retry period, an IMS restoration procedure is carried out to restore the communication session for the UE (as well as for other UEs assigned to the failed node) so that an available IMS node can continue to serve the UE. In at least some instances, existing IMS restoration procedures involve tearing down the existing communication session (e.g., sending an error response, such as a 504 error message, to the UE) in response to an IMS node becoming unavailable. This forces the UE to re-register with the IMS so that the UE can be re-assigned an available node (e.g., an available S-CSCF node). In this scenario, the service being provided to the UE is disrupted by the IMS restoration procedure. For example, a phone call may be dropped, and the user may be forced to re-dial the party with whom they were previously communicating.

Existing IMS restoration procedures can also involve unneeded communications between IMS nodes, which unnecessarily consumes network bandwidth during IMS restoration, and causes an undesirable delay that can be noticeable to the end user. For example, when a backup IMS node is called upon to provide service to a UE involved in a restoration procedure, the backup IMS node may transmit requests to other IMS nodes for additional information pertaining to the "unrecognized" UE (e.g., a profile recovery request), or to find a new IMS node to serve the UE, such as by issuing a third party register (TPR) message to discover a new, available AS to serve the UE, and so on. For a large number of UEs involved in a correspondingly large number of communication sessions that are affected by a failed IMS node(s), this added load on the network due to unneeded communication between IMS nodes can significantly impact network bandwidth.

Current IMS restoration procedures can also leave stale bindings between a UE involved in a restoration procedure and a previously-assigned IMS node. These stale bindings can remain in data repositories of the IMS core network, creating a data duplication problem where the repository data indicates that the UE is assigned to multiple IMS nodes of the same type. For example, a UE that has had a communication session restored might end up being assigned to multiple, different AS's. Accordingly, when a query is issued to discover information pertaining to the UE, and stale bindings exist in repository data for that UE, incorrect data may be returned for such a query.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
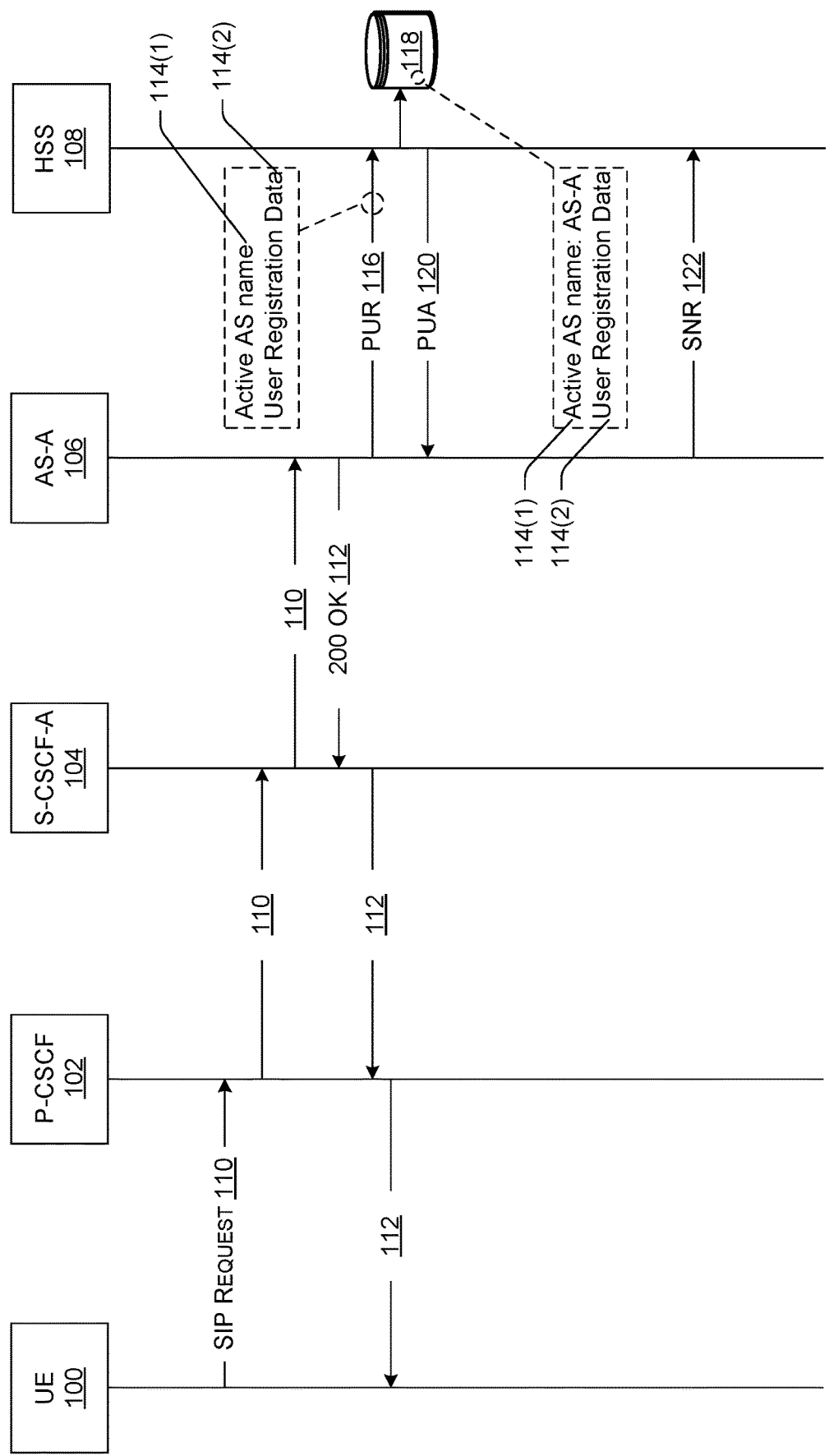
FIG. 1 is a diagram illustrating example signaling between a UE and various nodes within an IMS network during a registration procedure for the UE.

Described herein are techniques and systems for restoring a communication session in the event of S-CSCF node unavailability and/or AS unavailability. Prior to an IMS node becoming unavailable, attribute-value pairs (AVPs) can be stored at a home subscriber server (HSS), and these AVPs can subsequently be used (i.e., obtained from the HSS repository) by individual IMS nodes in an independent fashion (i.e., by communicating directly with the HSS) to restore a communication session for a UE due to an unavailable IMS node. The storage of the AVPs at the HSS can be part of a registration procedure for the UE.

Accordingly, a registration procedure for a UE includes sending, from an AS, and to a HSS for storage at the HSS, a first value for an "active AS name" attribute (i.e., a first AVP) and a second value for a "user registration data" attribute (i.e., a second AVP). These AVPs can be transmitted over a Diameter (Cx) interface from the AS to the HSS. Thus, at registration, the HSS stores, for a particular UE, the first AVP for the active AS name attribute and the second AVP for the user registration data attribute. Maintaining these AVPs in repository data of the HSS for a given UE allows for restoring a communication session for the UE in the event of S-CSCF node unavailability and/or AS unavailability. The storage of these AVPs in the HSS repository allows an individual IMS node to interact directly with the HSS to obtain information it can use to restore the communication session without having to tear down the communication session or issue unneeded communications to other IMS nodes.

After registration of a UE, the UE is assigned a first S-CSCF node. During a communication session for the UE, a proxy call session control function (P-CSCF) node can receive, via a communications interface, a Session Initiation Protocol (SIP) request from the UE, and, upon making an attempt to contact the first S-CSCF node, the P-CSCF node may determine that the first S-CSCF node is unavailable (e.g., the P-CSCF node may not receive a response from the first S-CSCF node, or may receive a negative response from the first S-CSCF node, indicating that the first S-CSCF node is unavailable).

In the event that the first S-CSCF node is determined to be unavailable, a process for restoring the communication session for the UE can include selecting, by the P-CSCF node, a second S-CSCF node, and sending, via the communications interface of the P-CSCF node, the SIP request to the second S-CSCF node. The second S-CSCF node can then send, via a communications interface of the second S-CSCF node, and to the HSS, a request for an identifier of an AS associated with the UE. Such a request can comprise a user data request (UDR) message that is sent over a Diameter interface from the second S-CSCF node to the HSS. The second S-CSCF node can then receive a response from the HSS including the identifier of the AS, where the identifier can comprise the first value for the active AS name attribute, which was previously stored in the HSS as the first AVP. The second S-CSCF node—now in possession of the identifier of the AS—can send the SIP request to the AS in order to restore the communication session for the UE. By interacting directly with the HSS to obtain the AS identifier, the second S-CSCF node does not have to issue a third party register (TPR) message to discover a new AS for the UE. This, in turn, prevents stale bindings from being stored in repository data that would otherwise occur if the UE were to be assigned a new, different AS from the AS the UE was assigned during registration. This results in a reduction of network bandwidth by avoiding an unnecessary TPR message, and a conservation of memory by avoiding the storage of duplicative, conflicting data for the UE. There is also no need to tear down the existing communication session to restore the communication session for the UE. Thus, the techniques and systems described herein do not force the UE to re-register on the IMS core, unlike existing IMS restoration procedures.

The AS that is assigned to the UE at registration (i.e., a first AS) can also become unavailable. The techniques and systems described herein allow for restoration of a communication session in the event that the first AS becomes unavailable. Accordingly, during a communication session for the UE, a P-CSCF node can receive, via a communications interface, a SIP request from the UE, and this SIP request can be forwarded to the assigned S-CSCF node. Upon making an attempt to contact the first AS, the assigned S-CSCF node may determine that the first AS is unavailable (e.g., the assigned S-CSCF node may not receive a response from the first AS, or may receive a negative response from the first AS, indicating that the first AS is unavailable)

In the event that the first AS is determined to be unavailable, a process for restoring the communication session for the UE can include selecting, by the assigned S-CSCF node, a second AS, and sending, via a communications interface of the assigned S-CSCF node, the SIP request to the second AS. The second AS can then send, via a communications interface of the second AS, and to the HSS, a request for the second value for the user registration data attribute associated with the UE. Such a request can comprise a UDR message that is sent over a Diameter interface from the second AS to the HSS. The second AS can then receive a response from the HSS including the second value for the user registration data attribute that was previously stored in the HSS as the second AVP. The second AS—now in possession of the second value for the user registration data attribute—can forward the SIP request to a next hop in order to restore the communication session for the UE, and the second AS can create a local user profile associated with the UE based at least in part on the second value for the user registration data attribute, the local user profile specifying an association between the UE and the second AS. Accordingly, a backup AS (e.g., the second AS in the above-process) no longer needs to perform a profile recovery procedure when it receives a SIP request for an unrecognized UE. This eliminates unnecessary communication between the AS and the S-CSCF during IMS restoration, unlike existing IMS restoration procedures.

In general, the techniques and systems described herein allow for faster restoration of a communication session, as well as a reduction in network bandwidth consumption, as compared to existing IMS restoration procedures that take longer and consume more network bandwidth. This is due, at least in part, to the elimination of unneeded communication between IMS nodes, as well as the avoidance of tearing down an existing communication session in order to restore it. This, in turn, can reduce processor load significantly when a large number of UEs are involved in a correspondingly large number of ongoing communication sessions impacted by an IMS node failure.

Also disclosed herein are systems comprising one or more processors and one or more memories, as well as non-transitory computer-readable media storing computer-executable instructions that, when executed, by one or more processors perform various acts and/or processes disclosed herein.

Example Environment

FIG. 1 is a diagram illustrating example signaling between a UE 100 and various nodes within an IMS network during a registration procedure for the UE 100. The IMS network can include various IMS nodes, including the IMS nodes shown in FIG. 1. FIG. 1 shows a P-CSCF node 102, a first S-CSCF node 104 (labeled "S-CSCF-A" 104 in FIG. 1), a first AS 106 (labeled "AS-A" 106 in FIG. 1), and a HSS 108. It is to be appreciated that the IMS network can include additional nodes that are not shown in FIG. 1, such as nodes including, without limitation, an interrogating CSCF (I-CSCF) node, an emergency CSCF (E-CSCF) node, a security gateway (SEG), a session border controller (SBC), and so on.

The IMS network that includes the IMS nodes 102-108 of FIG. 1 may be maintained and/or operated by one or more service providers, such as one or more wireless carriers ("operators"), that provide mobile IMS-based services to users (sometimes called "subscribers") who are associated with UEs, such as the UE 100. The IMS network may represent any type of SIP-based network that is configured to handle/process SIP signaling packets or messages. SIP is a signaling protocol that can be used to establish, modify, and terminate multimedia sessions (e.g., a multimedia telephony call) over packet networks, and to authenticate access to IMS-based services. Individual ones of the IMS nodes 102-108 of FIG. 1 can also be configured to transmit data to/from the HSS 108 using Diameter protocol over a Diameter (Cx) interface. Diameter protocol is defined by the Internet Engineering Task Force (IETF) in RFC 6733.

In accordance with various embodiments described herein, the terms "user equipment (UE)," "wireless communication device," "wireless device," "communication device," "mobile device," and "client device," may be used interchangeably herein to describe any UE e.g., the LIE 100) that s capable of transmitting/receiving data over the IMS network, perhaps in combination with other networks. A users can utilize the UE 100 to communicate with other users and associated UEs via the IMS network. For example, a service provider may offer multimedia telephony services that allow a subscribed user to call or message other users via the IMS network using his/her UE 100. A user can also utilize the UE 100 to receive, provide, or otherwise interact with various different IMS-based services by accessing the IMS network. In this manner, an operator of the IMS network may offer any type of IMS-based service, such as, telephony services, emergency services (e.g., E911), gaming services, instant messaging services, presence services, video conferencing services, social networking and sharing services, location-based services, push-to-talk services, and so on.

Furthermore, the IMS network that includes the IMS nodes 102-108 may enable peer-to-peer, client-to-client, and/or client-to-server, communications over wired and/or wireless networks using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

The UE 100 of FIG. 1 may be configured to register for, and thereafter access and utilize, one or more IMS-based services via the IMS network. To this end, the UE 100 may be configured to transmit, via a radio access network (RAN), messages to the IMS network. For example, the UE 100 may transmit messages to the IMS network as part of an IMS registration procedure where the UE 100 is requesting to register for an IMS-based service. Example signaling that is involved in such a registration procedure is shown in FIG. 1. The information stored at the HSS during this registration procedure allows for restoring a subsequent communication session in the event of S-CSCF unavailability and/or AS unavailability.

Accordingly, a registration procedure for the UE 100 can involve identifying the P-CSCF node 102 and sending a registration request via the RAN to the P-CSCF node 102. SIP may be used for transmitting such a registration message. As used herein, a "SIP request" is a message that is sent from the UE 100 to the IMS network using SIP protocol, and a "SIP response" is a message that is sent from the IMS network to the UE 100 using SIP protocol. Accordingly, a SIP request 110 that uses the SIP "REGISTER" method may be sent to the P-CSCF node 102 during an IMS registration procedure in order to request registration of the UE 100 for an IMS-based service.

The P-CSCF node 102 receives the SIP request 110 (e.g., using the SIP REGISTER method) from the UE 100, and forwards the SIP request 110 to the first S-CSCF node 104. It is to be appreciated that intermediate nodes can exist between any two adjacent IMS nodes shown in FIG. 1. For example, an I-CSCF node can be interposed between the P-CSCF node 102 and the first S-CSCF node 104 to process the SIP request 110 and forward the SIP request 110 to the first S-CSCF node 104. It is also to be appreciated that a user of the UE 100, and/or the UE 100 itself, can be authenticated, such as by using credential validation, signature verification, and the like, as part of the registration procedure.

The first S-CSCF node 104 may represent one of multiple available S-CSCF nodes that is chosen (or otherwise selected) for assignment to the registering UE 100. S-CSCF nodes, such as the first S-CSCF node 104, are sometimes referred to as "Registrars," and the process of allocating Registrars among users who are registering for IMS-based services is sometimes referred to as finding a "home CSCF" for the UE 100.

The first S-CSCF node 104 receives the SIP request 110 from the P-CSCF node 102 (or from an intermediate IMS node), and forwards the SIP request 110 to the first AS 106. The first AS 106 can be configured to provide any of the IMS-based services described herein as part of a subsequently established communication session. The first AS 106 can be selected in any suitable fashion. For example, the S-CSCF node 104 can issue a third party register (TPR) message to discover the first AS 106 as an available AS for serving the UE 100. Various additional checks and authentication procedures can be performed during the registration process of FIG. 1. If the results of the checks and authentication procedures indicate that the UE 100 can be registered on the IMS network, the first AS 106 can send a SIP response in the form of a 200 OK message 112 to confirm the successful registration of the UE 100. The 200 OK message 112 can be received by the first S-CSCF node 104, and the first S-CSCF node 104 can forward the 200 OK message 112 to the P-CSCF node 102, which is ultimately received at the UE 100. Before the 200 OK message 112 is forwarded by each IMS node, an individual IMS node (e.g., the first AS 106, the first S-CSCF node 104, etc.) may insert its identifier within a message header of the 200 OK message 112 to tell another IMS node that the UE 100 is assigned to the IMS nodes identified in the message header. In this manner, future SIP requests originating from the UE 100 and can be forwarded to the appropriate IMS node (e.g., the P-CSCF node 102 knows to forward a SIP request originating from the UE 100 to the first S-CSCF node 104).

As shown in FIG. 1, the first AS 106 is further configured to send multiple attribute-value pairs (AVPs) 114 to the HSS 108 for storage at the HSS 108 as part of the registration procedure for the UE 100. The sending of the AVPs 114 to the HSS 108 can be an asynchronous process to the transmission of the 200 OK message 112. An AVP can comprise a tuple <attribute name, value>. Thus, the AVPs 114 sent by the first AS 106 to the HSS 108 during registration can include, without limitation, a first AVP 114(1) having an attribute name called "active AS name" and an associated value (called a "first value" herein), and a second AVP 114(2) having an attribute name called "user registration data" and an associated value (called a "second value"

herein). The AVPs 114(1) and 114(2), as well as any additional AVPs, can be referred to collectively herein as AVPs 114.

The AVPs 114 can be transmitted from the first AS 106 to the HSS 108 over a Diameter interface in the form of a profile update request (PUR) message 116, as shown in FIG. 1. Uploading the AVPs 114 in this manner is sometimes referred to herein as "updating" the AVPs 114. For example, the first AS 106 can send a first value for the active AS name attribute to update the "active AS name" AVP 114(1). The first AS 106 can also send a second value for the user registration data attribute to update the "user registration data" AVP 114(2). It is to be appreciated that additional AVPs 114 to those shown in FIG. 1 can also be transmitted to the HSS 108 over the Diameter interface in the PUR message 116. For example, a "S-CSCF name" AVP 114 can also be included in the PUR message 116, which identifies the first S-CSCF node 104 that was assigned to the UE 100.

The first value of the active AS name AVP 114(1) identifies the first AS 106 as a serving AS for the UE 100. In some configurations, the first value of the active AS name AVP 114(1) can comprise a SIP Uniform Resource Identifier (URI) that uniquely identifies the first AS 106 and distinguishes it from other AS's. The first value of the active AS name AVP 114(1) is not limited to a SIP URI, however, and may comprise any suitable piece of information and/or data that is used to uniquely identify the first AS 106. One or more second values of the user registration data AVP 114(2) can comprise information about the UE's 100 registration, such as Feature CAPS (e.g., information about the transit roaming function (TRF) address), SIP instance information, and/or geodetic location information, and so on.

The HSS 108 can be associated with a master database 118 (sometimes referred to herein as an "HSS repository") that maintains data pertaining to UEs 100 that have registered, or are in the process of registering, on the IMS network. Accordingly, the HSS 108 can receive the AVPs 114 (including the first AVP 114(1) and the second AVP 114(2)) from the first AS 106 over the Diameter interface, and can store the AVPs 114 in association with the UE 100 in the master database 118. FIG. 1 shows HSS repository data as including the first, "active AS name" AVP 114(1) and the second, "user registration data" AVP 114(2) as a result of the PUR message 116 received from the first AS 106 during registration. FIG. 1 also shows an example first value of the active AS name AVP 114(1) that identifies the first AS 106 as "AS-A." Thus, the first, active AS name AVP 114(1) reflects the assignment of the first AS 106 to the UE 100 (sometimes referred to as an "AS binding"). Thus, storage of the first, active AS name AVP 114(1) in the master database 118 of the HSS 108 creates a binding between the UE 100 and the first AS 106 that is maintained in the HSS repository 118. Similarly, the storage of one or more second values for the second, user registration data AVP 114(2) in the master database 118 reflects information for a user profile associated with the UE 100.

The first AS 106 can receive a profile update answer (PUA) message 120 from the HSS 108 in response to the PUR message 116. The PUA message 120 can confirm that the AVPs 114 were successfully updated in the HSS repository 118. The PUA message 120 can be sent over a Diameter interface from the HSS 108 to the first AS 106.

In some embodiments, the first AS 106 can send a subscription notification request (SNR) message 122 that is issued as a request to receive any future notification of a change in the IMS user state for the UE 100. For example, if the UE 100 is reassigned to another AS as part of a restoration procedure described herein, the HSS 108 can send a subscription notification answer (SNA) message to the first AS 106 so that the first AS 106 is made aware of such a reassignment and can clear any local contact binding for the reassigned UE 100. This is described in more detail below for restoration in the event of AS unavailability.

Once the UE 100 is successfully registered on the IMS network, the UE 100 can originate a communication session, such a voice communication session (e.g., a phone call). Unless and until the first S-CSCF node 104 and/or the first AS 106 become unavailable, all SIP signaling that is part of the communication session, and that originates and terminates at the UE 100, is routed through the assigned first S-CSCF node 104 and the first AS 106. However, upon either or both of the first S-CSCF node 104 and/or the first AS 106 becoming unavailable (e.g., if these IMS nodes fail due to a malfunction or a crash of hardware or software), the AVPs 114(1) and 114(2) can be used by backup IMS nodes to restore the communication session for the UE 100 by interacting directly with the HSS 108.

Figure 2:
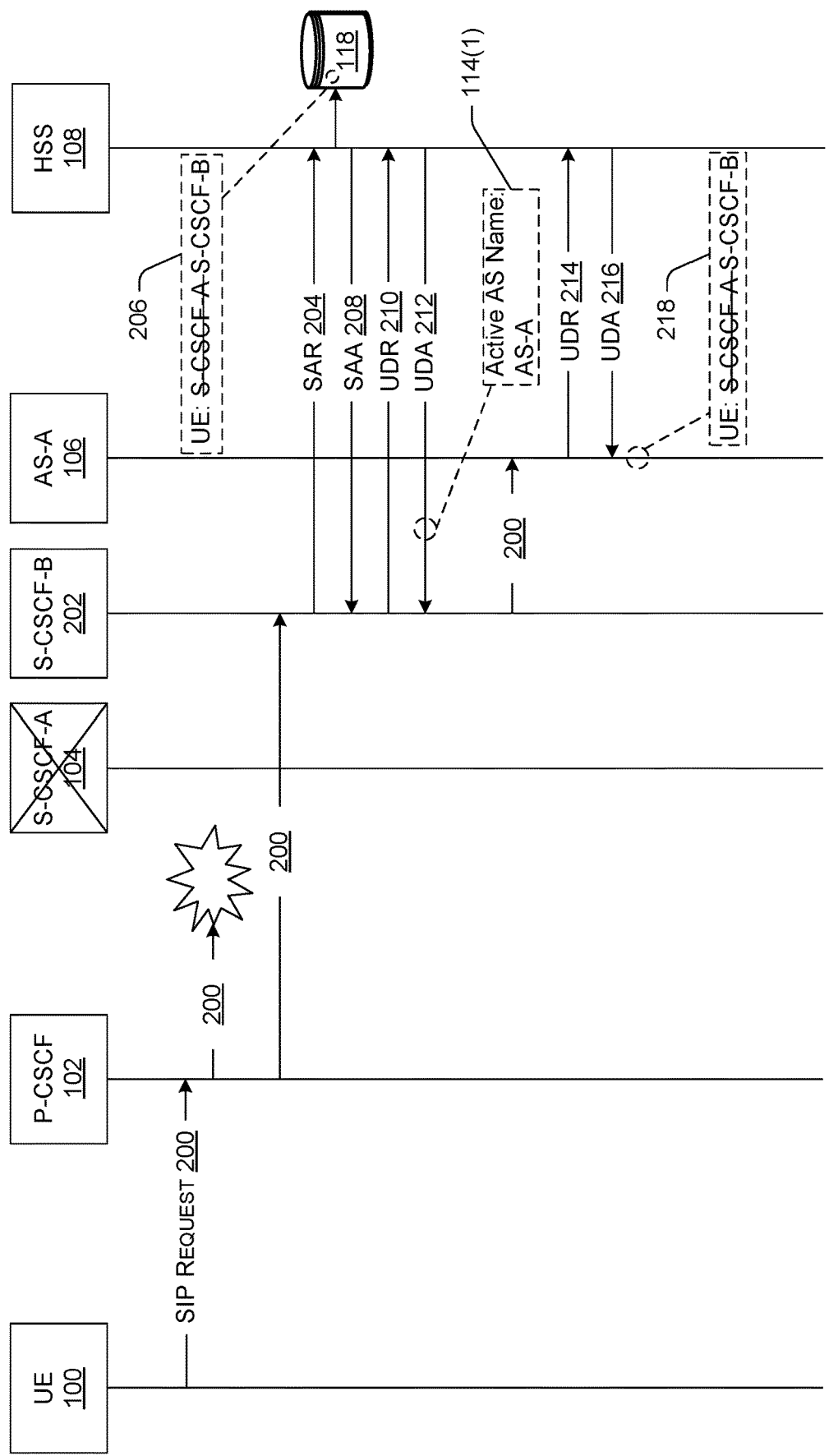
FIG. 2 is a diagram illustrating example signaling between a UE and various nodes within an IMS network to restore a communication session for the UE in the event of S-CSCF node unavailability.

FIG. 2 is a diagram illustrating example signaling between the UE 100 and various IMS nodes within the IMS network to restore a communication session for the UE 100 in the event of the first S-CSCF node 104 becoming unavailable. In the example of FIG. 2, the first S-CSCF node 104 may have experienced, after the UE's 100 successful registration, a network failure, or some other failure in hardware and/or software of the first S-CSCF node 104 that renders the first S-CSCF node 104 inoperative. Alternatively, the first S-CSCF node 104 may be operable but is nevertheless unreachable by the P-CSCF node 102 for some reason (e.g., a fiber cut between the P-CSCF node 102 and the first S-CSCF node 104).

Before the P-CSCF 102 discovers that the first S-CSCF node 104 is unavailable, the P-CSCF 102 may receive a SIP request 200 from the UE 100 as part of a communication session established for the UE 100. For example, the SIP request 200 can comprise a SIP message that uses the SIP INVITE method to establish the communication session. As such, the P-CSCF node 102 can receive a SIP request 200 that uses the SIP INVITE method to originate a communication session (e.g., a voice communication session with another UE).

In response to receiving the SIP request 200 at the P-CSCF node 102, the P-CSCF node 102 can attempt to contact the first S-CSCF node 104. The P-CSCF node 102 may know that the first S-CSCF node 104 is assigned to the UE 100 from the identifier (e.g., a fully qualified domain name (FQDN), IP address, etc.) of the first S-CSCF node 104 that was included in the message header of the 200 OK message 112 received at the P-CSCF node 102 during the registration procedure. The HSS repository 108 can also maintain the binding between the UE 100 and the first S-CSCF node 104.

In response to the P-CSCF node 102 attempting to contact the first S-CSCF node 104, the P-CSCF node 102 may not receive a response from the first S-CSCF node 104. In this "lack of response" scenario, the P-CSCF node 102 can poll the first S-CSCF node 104, and if the first S-CSCF node 104 fails to respond to the polling from the P-CSCF node 102 (e.g., within a predetermined period of time), the P-CSCF node 102 may determine, based on the lack of response from the first S-CSCF node 104 within the predetermined time period, that the first S-CSCF node 104 is unavailable. Alternatively, the P-CSCF node 102 may receive an explicit "negative" response from the first S-CSCF node 104, if the first S-CSCF node 104 is operational and/or able to communicate with the P-CSCF node 102. For example, the first S-CSCF node 104 may be operational, but overloaded to the point where it cannot handle additional SIP traffic. As another example, the first S-CSCF node 104 may experience a corruption in the software that processes SIP traffic, but is otherwise able to communicate with the P-CSCF node 102 to inform the P-CSCF node 102 that it is unavailable at the moment due to the corrupt software/code.

In response to determining that the first S-CSCF node 104 is unavailable, an IMS restoration technique is initiated where the P-CSCF node 102 selects a second S-CSCF node 202 (labeled "S-CSCF-B" 202 in FIG. 2), and sends the SIP request 200 to the second S-CSCF node 202. The P-CSCF node 102 is configured with "route advance" logic to select a different, available S-CSCF node as a backup without tearing down the current communication session. The route advance logic can be implemented to discover the second, available S-CSCF node 202 in various ways. For example, the second S-CSCF node 202 can be a predetermined S-CSCF node that is statically mapped as a backup S-CSCF node in case of unavailability of the assigned, first S-CSCF node 104. In other words, in response to determining that the first S-CSCF node 104 is unavailable, the P-CSCF node 102 can reference a predetermined mapping to select the second S-CSCF node 202 by default. Alternatively, the P-CSCF node 102 can issue a domain name system (DNS) query to a DNS server that returns an IP address (e.g., IPv4, IPv6, etc.) of an available S-CSCF node from a pool of available S-CSCF nodes. In some embodiments, the pool of available S-CSCF nodes can be returned in response to the DNS query, and the P-CSCF node 102 can select one of the S-CSCF nodes in the pool of available S-CSCF nodes. In any case, the DNS server that receives such a DNS query may have access to a traffic distribution server to determine one or more appropriate S-CSCF nodes from a pool of available S-CSCF nodes. The traffic distribution server may use criteria for allocating the second S-CSCF node 202, and the criteria may include any suitable criteria, such as load balancing criteria and other service criteria. For example, the traffic distribution server may have a preference for choosing the second S-CSCF node 202 because it is experiencing less traffic than other S-CSCF nodes, or because it has a lower processing load as compared to other S-CSCF nodes that are overloaded or handling a high volume of network traffic.

Regardless of how it is selected, the second S-CSCF node 202 can receive the SIP request 200 from the P-CSCF node 102 (or from an intermediate IMS node). In response to receiving the SIP request 200, the second S-CSCF node 202 is configured to send a request for restoration information to the HSS 108 over a Diameter interface. This request is shown in the form of a server assignment request (SAR) message 204. The SAR message 204 can include a server assignment type (SAT) value set to "NO_Assignment" in order to receive the registration data for the UE 100. An example of a SAR message 204 is as follows: SAR (IMPU, S-CSCF Name, SAT=NO_ASSIGNMENT), where IMPU is the IP multimedia public identity of the UE 100.

In response to receiving the SAR message 204, the HSS 108 can enable restoration and set a "reassignment pending" flag to TRUE, meaning that the UE 100 is in the process of being reassigned to a different S-CSCF node (in this case, the second S-CSCF node 202). Once the HSS 108 overwrites the value for the S-CSCF name AVP 114 with the identifier of the second S-CSCF node 202, as shown in FIG. 2 by the S-CSCF binding 206, the "reassignment pending" flag can be set to FALSE. Thereafter, the S-CSCF binding 206 is updated in the HSS repository 118 to reflect an association between the UE 100 and the second S-CSCF node 202.

The second S-CSCF node 202 can receive a server assignment answer (SAA) message 208 from the HSS 108 over a Diameter interface in response to sending the SAR message 204. The SAA message 208 can include the restoration information requested by the second S-CSCF node 202 via the SAR message 204. An example of a SAA message 208 is as follows: SAA (IMPU, User-Data, S-CSCF-Restoration-Info, Associated-Identities). The receipt of the SAA message 208 by the second S-CSCF node 202 informs the second S-CSCF node 202 that it is was not originally assigned to the UE 100 during the registration procedure for the UE 100. Furthermore, the second S-CSCF node 202 has no AS mapping to know where (i.e., which AS address) to forward the SIP request 200.

Accordingly, the second S-CSCF node 202 is configured to send a UDR message 210 to the HSS 108 in order to obtain, from the HSS repository 118, the first value of the active AS name AVP 114(1) that was stored in the master database 118 during registration of the UE 100. The second S-CSCF node 202 can therefore send a request (via the UDR message 210) for an identifier of the first AS 106 that is associated with the UE 100. The UDR message 210 can be sent over a Diameter interface to the HSS 108, and can include a request for the first value of the active AS name AVP 114(1). An example of a UDR message 210 is as follows: UDR (Active AS Name).

The HSS 108 can transmit a user data answer (UDA) message 212 to the second S-CSCF 202 that includes the identifier of the first AS 106. Recall that the identifier of the first AS 106 was previously stored in the master database 118 as the first value of the first AVP 114(1) for the active AS name attribute. The identifier of the first AS 106 that is returned in the UDA message 212 can comprise a SIP URI for the first AS 106. An example of a UDA message 212 is as follows: UDA (AS SIP URI). Upon receiving the UDA message 212, the second S-CSCF 202 now has the AS mapping for the UE 100 that can be used to restore the communication session for the UE 100.

Using the AS mapping from the UDA message 212, the second S-CSCF node 202 can send the SIP request 200 to the first AS 106 identified by the first value for the active AS name AVP 114(1). For example, the second S-CSCF node 202 can use the SIP URI received in the UDA message 212 to forward the SIP request 200 to the first AP 106 that the UE 100 registered with before the first S-CSCF node 104 became unavailable.

The first AS 106 can receive the SIP request 200 from the second S-CSCF node 202. However, from the perspective of the first AS 106, the S-CSCF name has changed because the first AS 106 was previously aware of the binding between the UE 100 and the first S-CSCF 104, but now, the SIP request 200 includes a different S-CSCF name (e.g., in a message header of the SIP request 200, such as a record-route header). In response to receiving the SIP request 200 with a different, and unfamiliar, S-CSCF name in the message header, the first AS 106 can confirm the new UE-to-S-CSCF-B association by contacting the HSS 108 over a Diameter interface. This confirmation request is shown in FIG. 2 by the UDR message 214 sent from the first AS 106 to the HSS 108. This UDR message 214 acts as a request by the first AS 106 to confirm that the HSS 108 has updated the S-CSCF binding 206 for the UE 100 with the identifier of the second S-CSCF 202 in the master database 118. The UDR message 214 can include a request for the UE's 100 registration status and the S-CSCF name. An example of a UDR message 214 sent from the first AS 106 is as follows: UDR (User State/S-CSCF Name).

The HSS 108—having previously set the "reassignment pending" flag to FALSE and overwritten the value of the S-CSCF name AVP 114 in the master database 118—can send a UDA message 216 back to the first AS 106 in response to the UDR message 214 that confirms that the UE 100 is registered in the IMS core network with the second S-CSCF node 202 that forwarded the SIP request 200 to the first AS 106. An example of a UDA message 216 sent to the first AS 106 is as follows: UDA (Registered, S-CSCF-B). This indicates to the first AS 106 that the registration status of the UE 100 is "Registered," and the S-CSCF binding 206 has been overwritten with the identifier of the second S-CSCF node 202 (in this case, "S-CSCF-B").

In response to confirming the S-CSCF binding 206 between the UE 100 and the second S-CSCF node 202, the first AS 106 can update a local user profile that the first AS 106 maintains for the UE 100 with the new association between the UE 100 and the second S-CSCF node 202. In other words, the first AS 106 can update a local contact binding 218 so that the local contact binding specifies an association between the UE 100 and the second S-CSCF node 202. This local contact binding 218 can be maintained in local storage of the first AS 106.

With the updated contact binding 218, the first AS 106 can then forward the SIP request 200 to a next hop (i.e., a next IMS node). In the case of a communication session with another UE, the SIP request 200 can ultimately be forwarded as a SIP response to the other UE to allow the multiple UEs to communicate over the IMS core.

Figure 3:
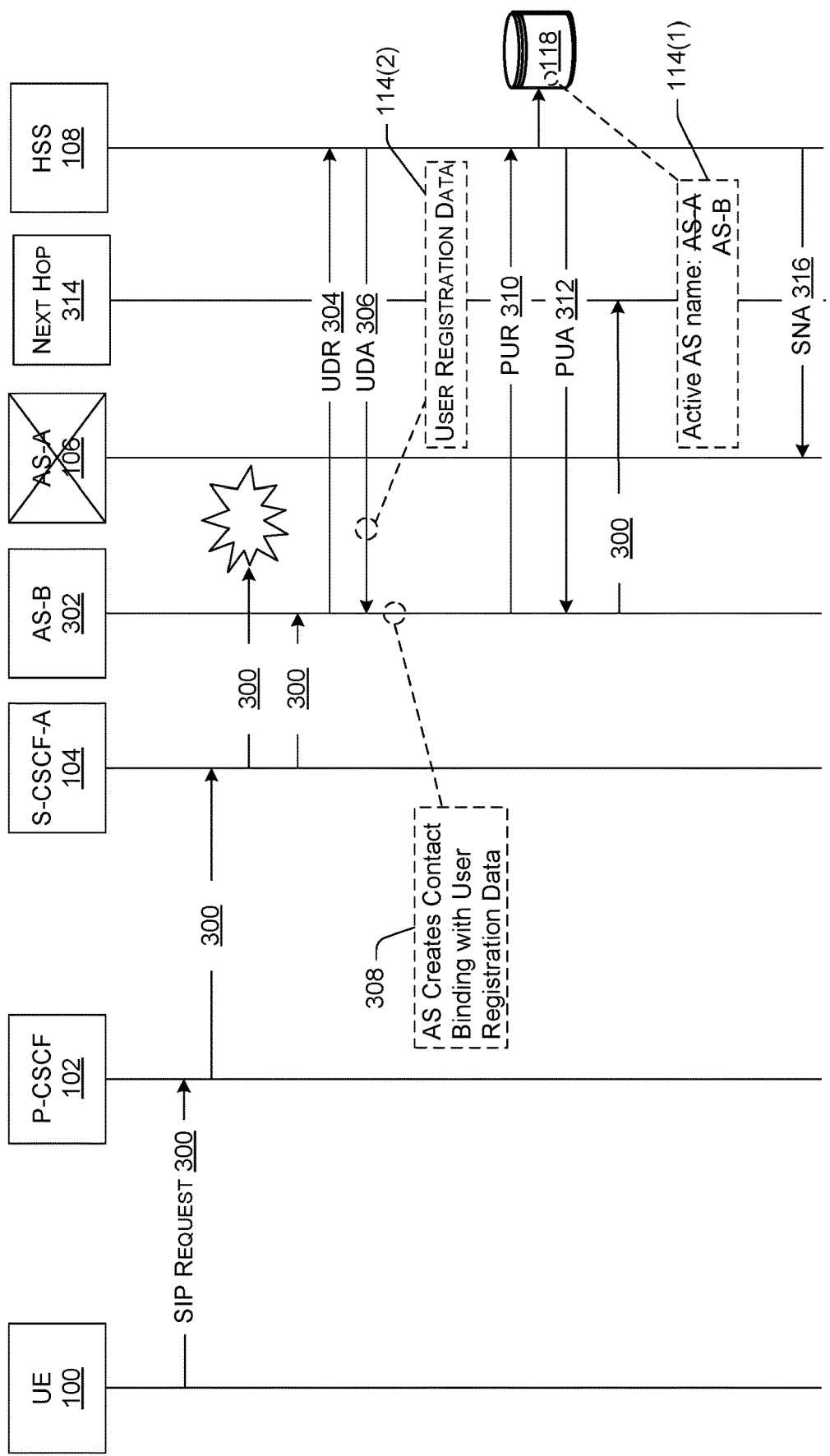
FIG. 3 is a diagram illustrating example signaling between a UE and various nodes within an IMS network to restore a communication session for the UE in the event of AS unavailability.

FIG. 3 is a diagram illustrating example signaling between a UE 100 and various IMS nodes within an IMS network to restore a communication session for the UE 100 in the event of the first AS 106 becoming unavailable. In the example of FIG. 3, the first AS 106 may have experienced, after the UE's 100 successful registration, a network failure, or some other failure in hardware and/or software of the first AS 106 that renders the first AS 106 inoperative, similar to the case in FIG. 2 for the first S-CSCF 104. Alternatively, the first AS 106 may be operable but is nevertheless unreachable by the currently-assigned S-CSCF node for some reason (e.g., a fiber cut between the assigned S-CSCF node and the first AS 106). In FIG. 3, the currently assigned S-CSCF node is shown as the first S-CSCF node 104. However, it is to be appreciated that, in the event that the first S-CSCF node 104 also becomes unavailable, the restoration techniques described with reference to FIG. 2 can be carried out to reassign the UE 100 to the second S-CSCF node 202. In this scenario, the currently-assigned S-CSCF node would be the second S-CSCF node 202. Thus, FIG. 3 could be described in the same way using the second S-CSCF node 202 instead of the first S-CSCF node 104.

Before the first S-CSCF node 104 discovers that the first AS 106 is unavailable, the first S-CSCF node 104 may receive a SIP request 300 that originated from the UE 100 as part of a communication session established for the UE 100. FIG. 3 shows, in a similar fashion to that described with reference to FIG. 2, that the SIP request 300 can be received by the P-CSCF node 102, and forwarded, by the P-CSCF node to the first S-CSCF node 104. In some embodiments, the SIP request 300 can comprise a SIP message that uses the SIP INVITE method to establish the communication session. As such, the first S-CSCF node 104 can receive a SIP request 300 that uses the SIP INVITE method to originate a communication session (e.g., a voice communication session with another UE).

In response to receiving the SIP request 300 at the first S-CSCF node 104, the first S-CSCF node 104 can attempt to contact the first AS 106. The first S-CSCF node 104 may know that the first AS 106 is assigned to the UE 100 from the identifier (e.g., a fully qualified domain name (FQDN), IP address, etc.) of the first AS 106 that was included in the message header of the 200 OK message 112 received at the first S-CSCF node 104 during the registration procedure. The HSS repository 108 can also maintain the binding between the UE 100 and the first AS 106, such as, by storing the active AS name AVP 114(1) in the master database 118.

In response to the first S-CSCF node 104 attempting to contact the first AS 106, the first S-CSCF node 104 may not receive a response from the first AS 106. In this "lack of response" scenario, the first S-CSCF node 104 can poll the first AS 106, and if the first AS 106 fails to respond to the polling from the first S-CSCF node 104 (e.g., within a predetermined period of time), the first S-CSCF node 104 may determine, based on the lack of response from the first AS 106 within the predetermined time period, that the first AS 106 is unavailable. Alternatively, the first S-CSCF node 104 may receive an explicit "negative" response from the first AS 106, if the first AS 106 is operational and/or able to communicate with the first S-CSCF node 104. For example, the first AS 106 may be operational, but overloaded to the point where it cannot handle additional SIP traffic. As another example, the first AS 106 may experience a corruption in the software that processes SIP traffic, but is otherwise able to communicate with the first S-CSCF node 104 to inform the first S-CSCF node 104 that it is unavailable at the moment due to the corrupt software/code.

In response to determining that the first AS 106 is unavailable, an IMS restoration technique is initiated where the first S-CSCF node 104 selects a second AS 302 (labeled "AS-B" 302 in FIG. 3), and sends the SIP request 300 to the second AS 302. The selection of the backup AS 302 can be implemented in any suitable manner, such as the techniques described in reference to FIG. 2 for selecting a backup S-CSCF node. For example, the second AS 302 can be a predetermined AS that is statically mapped as a backup AS in case of unavailability of the assigned, first AS 106. In other words, in response to determining that the first AS 106 is unavailable, the first S-CSCF node 104 can reference a predetermined mapping to select the second AS 302 by default. Alternatively, the first S-CSCF node 104 can issue a DNS query to a DNS server that returns an IP address (e.g., IPv4, IPv6, etc.) of an available AS from a pool of available AS's.

Regardless of how it is selected, the second AS 302 can receive the SIP request 300 from the first S-CSCF node 104 (or from an intermediate IMS node). At this point in time, the second AS 302 has no information regarding the UE's 100 registration status. Accordingly, the second AS 302 is configured to send a UDR message 304 to the HSS 108 in order to obtain, from the HSS repository 118, the second value(s) of the user registration data AVP 114(2) that was stored in the master database 118 during registration of the UE 100. The second AS 302 can therefore send a request (via the UDR message 304) for the UE's 100 registration status, as well as the S-CSCF name, and the user registration data maintained in the "user registration data" AVP 114(2). The UDR message 304 can be sent over a Diameter interface to the HSS 108, and can include a request for the second value(s) of the user registration data AVP 114(2). An example of a UDR message 304 is as follows: UDR (User State/S-CSCF Name/user registration data).

The HSS 108 can transmit a UDA message 306 to the second AS 302 that includes second value(s) of the user registration data AVP 114(2), as well as an identifier of the assigned S-CSCF node (here, the identifier of the first S-CSCF node 104), and the UE's 100 registration status. Recall that the user registration data AVP 114(2) was previously stored in the master database 118 during registration. Upon receiving the UDA message 306, the second AS 302 now has information about the UE's 100 registration, such as Feature CAPS, SIP instance information, and/or geodetic location information. This registration information can be used by the second AS 302 to restore the communication session for the UE 100.

Using the user registration data in the user registration data AVP 114(2) sent via the UDA message 306, the second AS 302 can create a new contact binding 308 by creating a local user profile for the UE 100 that specifies an association between the UE 100 and the second AS 302.

The second AS 302 is further configured to send a PUR message 310 to the HSS 108 over a Diameter interface in order to update the first value for the active AS name AVP 114(1) with the identifier (e.g., the SIP URI) of the second AS 302. The second AS 302 can receive a PUA message 312 from the HSS 108 in response to the PUR message 310. The PUA message 312 can confirm that the active AS name AVP 114(1) was successfully updated in the HSS repository 118 with the identifier of the second AS 302 (here, "AS-B"). The PUA message 312 can be sent over a Diameter interface from the HSS 108 to the second AS 302.

With the contact binding 308 created at the second AS 302, and the HSS repository 118 updated to reflect the UE's 100 association with the second AS 302, the second AS 302 can forward the SIP request 300 to a next hop 314 (i.e., a next IMS node). In the case of a communication session with another UE, the SIP request 300 can ultimately be forwarded as a SIP response to the other UE to allow the multiple UEs to communicate over the IMS core.

At this point a local user profile at the first AS 106 that specifies the association between the UE 100 and the first AS 106 can remain intact if the first AS 106 is still operational. For example, the first AS 106 may be unavailable to the first S-CSCF node 104, but still available to the HSS 108 such that the HSS 108 can communicate with the first AS 106 while the first S-CSCF node 104 cannot. Accordingly, the HSS 108 can send a SNA message 316 to the first AS 106 so that the first AS 106 is made aware of the reassignment of the UE 100 to the second AS 302, and so that the first AS 106 can delete a local user profile at the first AS 106 that includes a local contact binding for the UE 100 specifying an association between the UE 100 and the first AS 106 because this local contact binding at the first AS 106 has become a stale binding (i.e., it is no longer accurate due to the reassignment of the UE 100 to the second AS 302). Accordingly, the SNA message 316 can include an instruction that is executable by a processor of the first AS 106 to delete the local user profile that includes the local contact binding between the UE 100 and the first AS 106. In some embodiments, the SNA message 316 includes the UE's 100 registration status set to "NOT REGISTERED", which causes the local user profile of the UE 100 to be deleted from local storage of the first AS 106. An example SNA message 316 is as follows: SNA (User State NOT REGISTERED). The SNA message 316 can be sent to the first AS 106 even in a scenario where the first AS 106 is completely disabled, or otherwise unable to receive and process the SNA message 316. In this scenario, the SNA message 316 simply will not be received or processed by the first AS 106. Notably, the restoration procedure described in FIG. 3 does not involve sending a de-register message/command towards the S-CSCF, and does not otherwise involve sending a notification towards the UE 100 to terminate its registration. In this manner, the communication session is not torn down, and the UE 100 is not forced to re-register with the IMS core to have its communication session restored with a secondary AS 302. Furthermore, the second AS 302 does not have to perform any profile recovery action for the UE 100; instead, the UDR message 304 is sent directly to the HSS 108 to obtain the user registration data AVP 114(2), which is much more streamlined and independent of other IMS nodes, as compared to traditional profile recovery procedures.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
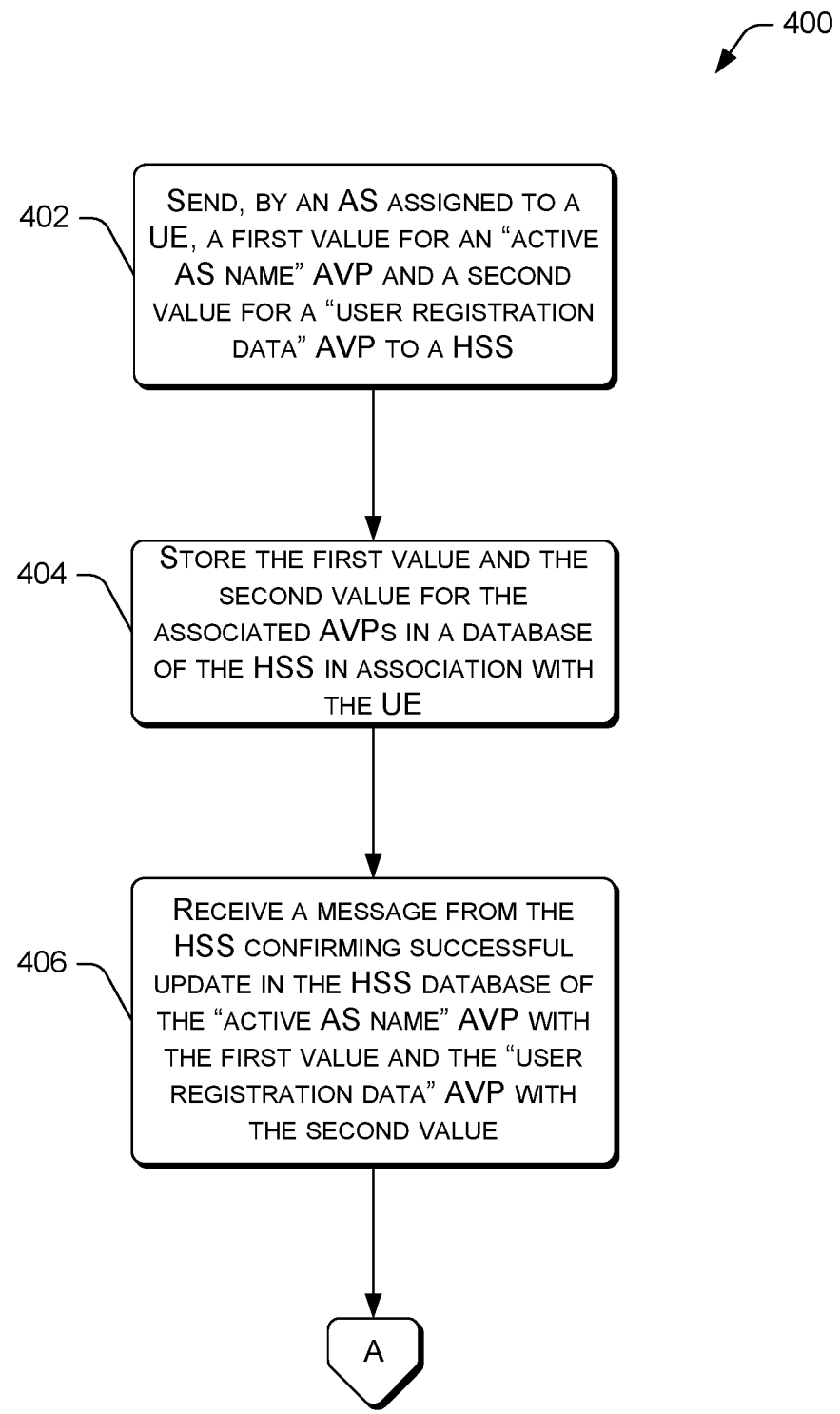
FIG. 4 illustrates a flowchart of an example process for a registration procedure that involves storing attribute-value pairs (AVPs) in HSS repository data.

FIG. 4 illustrates a flowchart of an example process 400 for a registration procedure that involves storing AVPs in HSS repository data. In describing the process 400, reference is made to the diagram of FIG. 1.

At 402, an AS assigned to a UE that is registering on the IMS network (e.g., the first AS 106) can send a first value for an "active AS name" AVP 114(1) and a second value for a "user registration data" AVP 114(2) to a HSS 108 for storage at the HSS 108. In some embodiments, the AVPs 114(1) and 114(2) sent at 402 can be transmitted via a PUR message 116 over a Diameter interface from the first AS 106 to the HSS 108. In some embodiments, the first value for the active AS name AVP 114(1) can comprise a SIP URI of the first AS 106. The first AS 106 can send one or more second values for the user registration data AVP 114(2), such as a second value for Feature CAPs, a SIP instance, and/or geodetic location information of the UE 100.

At 404, the HSS 108 can store the received first value for the active AS name AVP 114(1) and the received second value for the user registration data AVP 114(2) in association with the UE 100 within the master database 118 of the HSS 108.

At 406, a confirmation message can be received at the first AS 106 from the HSS 108 confirming the successful updating of the active AS name AVP 114(1) with the first value (e.g., the SIP URI of the first AS 106) and the user registration data AVP 114(2) with the second value.

The process 400 can occur during an IMS registration procedure for the UE 100. The AVPs 114(1) and 114(2) can be used independently by individual IMS nodes to restore a subsequent communication session for the UE 100 in the event of S-CSCF and/or AS unavailability.

Figure 5:
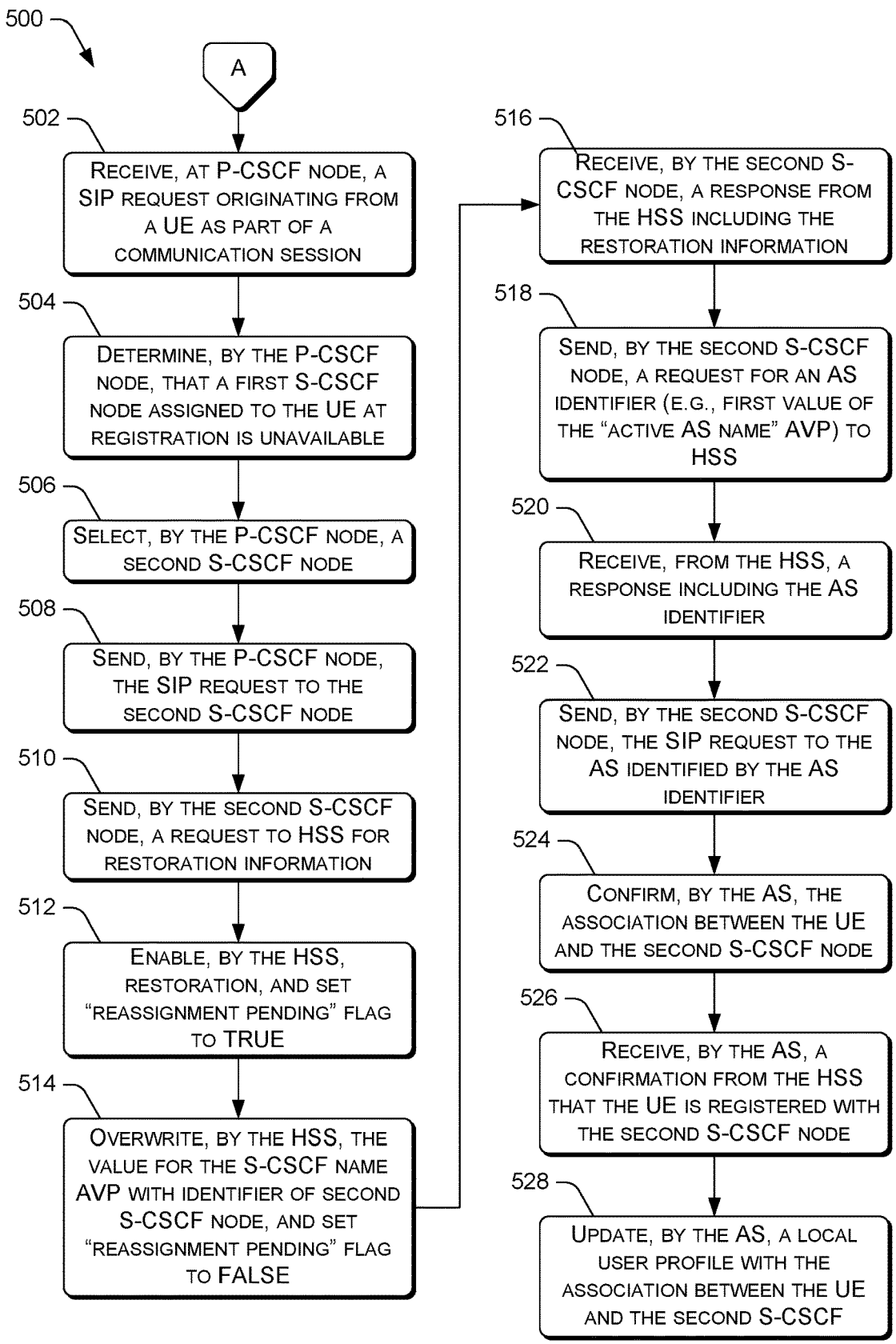
FIG. 5 illustrates a flowchart of an example process for a restoration procedure in the event of S-CSCF node unavailability.

FIG. 5 illustrates a flowchart of an example process 500 for a restoration procedure in the event of S-CSCF node unavailability. In describing the process 500, reference is made to the diagram of FIG. 2. Furthermore, as shown by the off-page reference "A" in FIGS. 4 and 5, the process 500 may continue from the process 400, such as from step 406 of the process 400.

At 502, a P-CSCF node 102 can receive, via a communications interface of the P-CSCF node 102, a SIP request 200 (e.g., a SIP message using the SIP INVITE method) originating from the UE 100 as part of a communication session. For example, the user of the UE 100 can dial a phone number to originate a voice communication session (e.g., a phone call, video conference, etc.) and to communicate with another user over the IMS network. The UE 100 can send a SIP request 200 to the P-CSCF node 102 for this purpose.

At 504, the P-CSCF node 102, in response to making an attempt to contact a first S-CSCF node 104 that was assigned to the UE 100 as part of a registration procedure, can determine that the first S-CSCF node 104 is unavailable, as described herein.

At 506, the P-CSCF node 102 can select a second S-CSCF node 202. For example, the P-CSCF node 102 can store, in memory of the P-CSCF node 102, route advance logic, or other computer-executable instructions, to select the second S-CSCF node 202. As described herein, the selection of the second S-CSCF node 202 can be accomplished in any suitable manner, such as by use of a static mapping to select the second S-CSCF node 202 by default, or by DNS discovery, and the like.

At 508, the P-CSCF node 102 can send, via the communications interface of the P-CSCF node 102, the SIP request 200 to the second S-CSCF node 202.

At 510, the second S-CSCF node 202 can send a request for restoration information to the HSS 108 over a Diameter interface, such as a request in the form of a SAR message 204 (shown in FIG. 2). The SAR message 204 can include a SAT value set to "NO_Assignment" in order to receive the registration data for the UE 100.

At 512, the HSS 108 can enable restoration and set a "reassignment pending" flag to TRUE in response to receiving the SAR message 204 from the second S-CSCF node 202.

514, the HSS 108 can overwrite the value for the S-CSCF name AVP 114 (in this example, the first identifier of the first S-CSCF node 104) with the identifier of the second S-CSCF node 202. This is shown in FIG. 2 by the S-CSCF binding 206. The HSS 108 can also set the "reassignment pending" flag to FALSE at 514.

516, the second S-CSCF node 202 can receive a SAA message 208 from the HSS 108 over a Diameter interface in response to sending the SAR message 204. The SAA message 208 can include the restoration information requested at 510, by the second S-CSCF node 202, via the SAR message 204.

At 518, the second S-CSCF node 202 can send, via a communications interface of the second S-CSCF node 202, a request to a HSS 108 for an identifier (e.g., a SIP URI) of an AS associated with the UE 100 (i.e., the AS assigned to the UE during IMS registration). The identifier requested at 510 can be maintained in the HSS repository 118 as the first value of the active AS name AVP 114(1). As such, the request sent at 510 can be in the form of a UDR message 210 transmitted over a Diameter interface to the HSS 108.

At 520, the second S-CSCF node 202 can receive, via the communications interface of the second S-CSCF node 202, a response from the HSS 108 that includes the identifier of the AS assigned to the UE 100, such as the first AS 106. The response received at 512 can be in the form of a UDA message 212.

At 522, the second S-CSCF node 202 can send, via the communications interface of the second S-CSCF node 202, the SIP request 200 to the first AS 106 identified by the identifier received at 512.

At 524, and in response to receiving the SIP request 200 with a different, and unfamiliar, S-CSCF name in the message header, the AS identified by the identifier received at 520 can confirm the new UE-to-S-CSCF-B association by contacting the HSS 108 over a Diameter interface. This confirmation request is shown in FIG. 2 by the UDR message 214 sent from the first AS 106 to the HSS 108. This UDR message 214 acts as a request by the first AS 106 to confirm that the HSS 108 has updated the S-CSCF binding 206 for the UE 100 with the identifier of the second S-CSCF 202 in the master database 118. The UDR message 214 can include a request for the UE's 100 registration status and the S-CSCF name.

At 526, the first AS 106 can receive a response from the HSS 108 can send a UDA message 216 back to the first AS 106 in response to the UDR message 214 that confirms that the UE 100 is registered in the IMS core network with the second S-CSCF node 202 that forwarded the SIP request 200 to the first AS 106 at 522.

At 528, in response to confirming the S-CSCF binding 206 between the UE 100 and the second S-CSCF node 202, the first AS 106 can update a local user profile that the first AS 106 maintains for the UE 100 with the new association between the UE 100 and the second S-CSCF node 202. In other words, the first AS 106 can update a local contact binding 218 so that the local contact binding specifies an association between the UE 100 and the second S-CSCF node 202. This local contact binding 218 can be maintained in local storage of the first AS 106.

Figure 6:
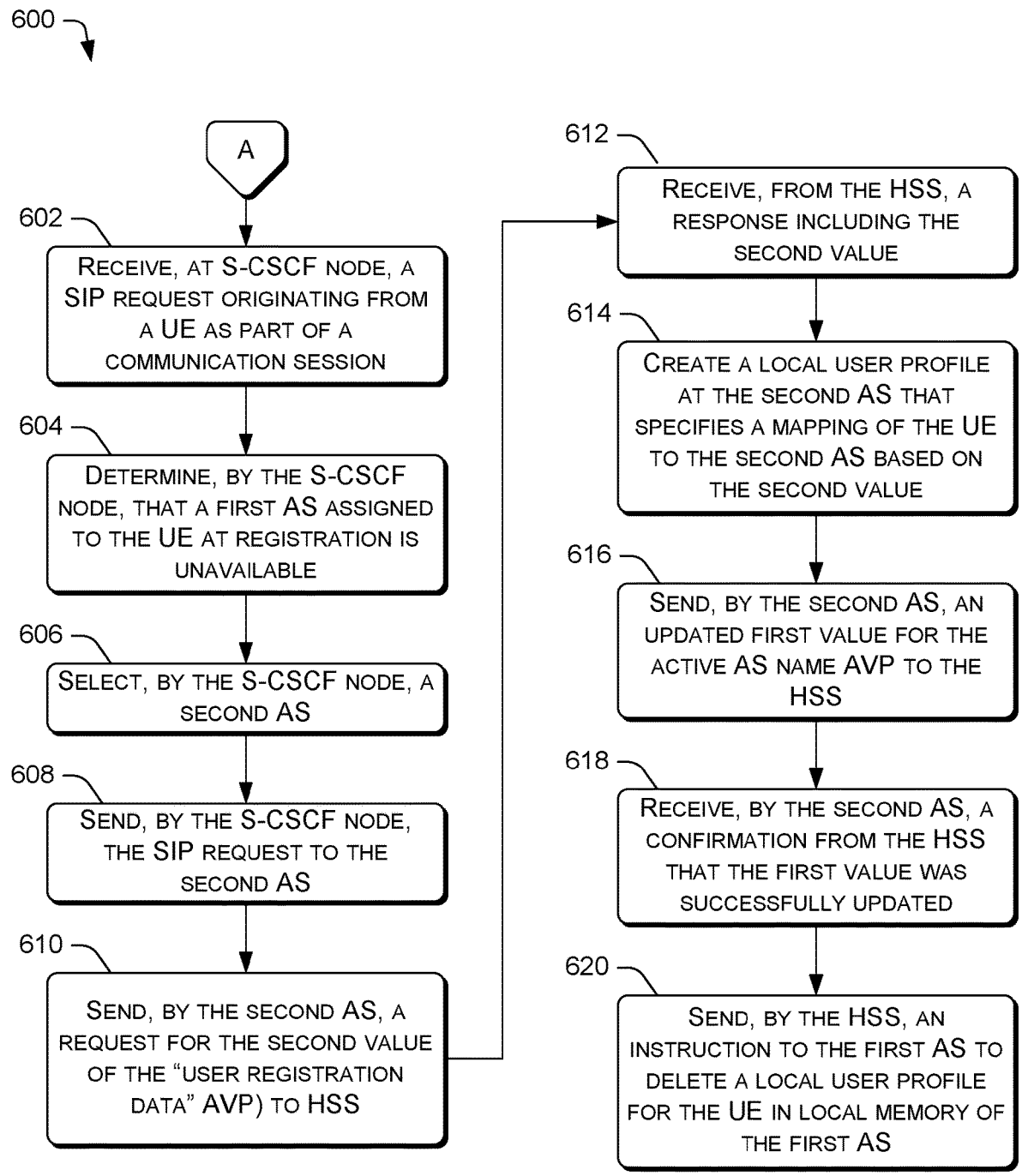
FIG. 6 illustrates a flowchart of an example process for a restoration procedure in the event of AS unavailability.

FIG. 6 illustrates a flowchart of an example process 600 for a restoration procedure in the event of AS unavailability. In describing the process 600, reference is made to the diagram of FIG. 3. Furthermore, as shown by the off-page reference "A" in FIGS. 4 and 6, the process 600 may continue from the process 400, such as from step 406 of the process 400. Furthermore, the process 600 can be combined with the process 500 to restore a communication session in the event of both S-CSCF unavailability and AS unavailability.

At 602, a S-CSCF node 104 (or 202) can receive, via a communications interface of the S-CSCF node 104, a SIP request 300 (e.g., a SIP message using the SIP INVITE method) originating from the UE 100 as part of a communication session. For example, the user of the UE 100 can dial a phone number to originate a voice communication session (e.g., a phone call, video conference, etc.) and to communicate with another user over the IMS network. The UE 100 can send a SIP request 300 to the P-CSCF node 102 for this purpose, which forwards the SIP request 300 to the first S-CSCF node 104 that was assigned to the UE 100 at registration.

At 604, the first S-CSCF node 104, in response to making an attempt to contact a first AS 106 that was assigned to the UE 100 as part of a registration procedure, can determine that the first AS 106 is unavailable, as described herein.

At 606, the first S-CSCF node 104 can select a second AS 302. For example, the first S-CSCF node 104 can store, in memory of the first S-CSCF node 104, route advance logic, or other computer-executable instructions, to select the second AS 302. As described herein, the selection of the second AS 302 can be accomplished in any suitable manner, such as by use of a static mapping to select the second AS 302 by default, or by DNS discovery, and the like.

At 608, the first S-CSCF node 104 can send, via the communications interface of the first S-CSCF node 104, the SIP request 300 to the second AS 302.

At 610, the second AS 302 can send, via a communications interface of the second AS 302, a request to a HSS 108 for the second value for the user registration data AVP 114(2). The second value requested at 610 was previously stored in the HSS repository 118 as part of the registration procedure for the UE 100. As such, the request sent at 610 can be in the form of a UDR message 304 transmitted over a Diameter interface to the HSS 108.

At 612, the second AS 302 can receive, via the communications interface of the second AS 302, a response from the HSS 108 that includes the second value for the user registration data AVP 114(2). The response received at 612 can be in the form of a UDA message 306.

At 614, the second AS 302 can create a user profile for the UE 100 that specifies an association between the UE 100 and the second AS 302 based on the second value for the user registration data AVP 114(2).

At 616, the second AS 302 can send a PUR message 310 to the HSS 108 over a Diameter interface in order to update the first value for the active AS name AVP 114(1) with the identifier (e.g., the SIP URI) of the second AS 302.

At 618, the second AS 302 can receive a PUA message 312 from the HSS 108 in response to the PUR message 310. The PUA message 312 can confirm that the active AS name AVP 114(1) was successfully updated in the HSS repository 118 with the identifier of the second AS 302 (here, "AS-B"). The PUA message 312 can be sent over a Diameter interface from the HSS 108 to the second AS 302.

At 620, the HSS 108 can send a SNA message 316 to the first AS 106 so that the first AS 106 is made aware of the reassignment of the UE 100 to the second AS 302, and so that the first AS 106 can delete a local user profile at the first AS 106 that includes a local contact binding for the UE 100 specifying an association between the UE 100 and the first AS 106 because this local contact binding at the first AS 106 has become a stale binding (i.e., it is no longer accurate due to the reassignment of the UE 100 to the second AS 302). Accordingly, the SNA message 316 can include an instruction that is executable by a processor of the first AS 106 to delete the local user profile that includes the local contact binding between the UE 100 and the first AS 106. In some embodiments, the SNA message 316 includes the UE's 100 registration status set to "NOT REGISTERED", which causes the local user profile of the UE 100 to be deleted from local storage of the first AS 106.

Figure 7:
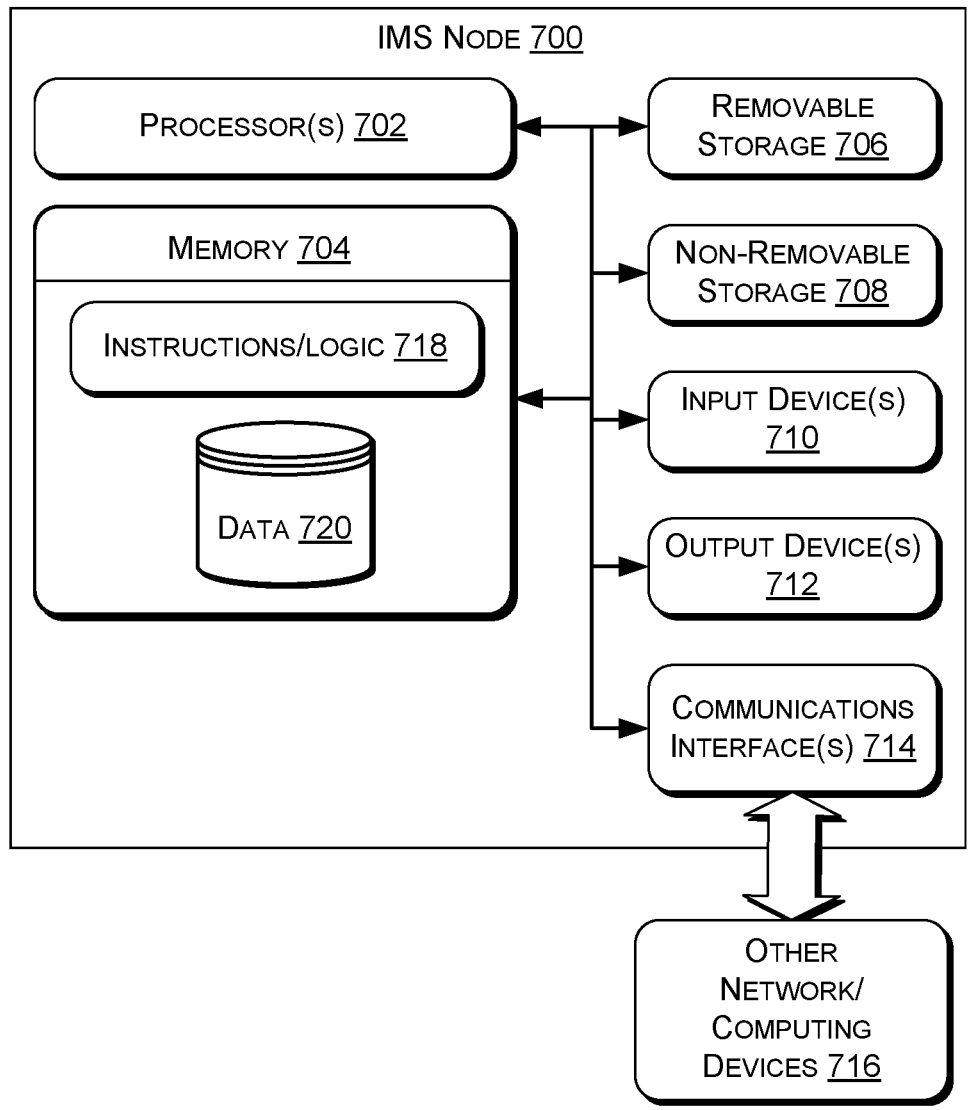
FIG. 7 is a block diagram of an example IMS node architecture in accordance with various embodiments.

FIG. 7 is a block diagram of an example IMS node 700 architecture in accordance with various embodiments. The IMS node(s) 700 may be representative of an individual P-CSCF node 102, an individual S-CSCF node (e.g., the first S-CSCF node 104 or the second S-CSCF node 202), an individual AS (e.g., the first AS 106 or the second AS 302), or the HSS 108.

As shown, the IMS node(s) 700 may include one or more processors 702 and one or more forms of computer-readable memory 704. The IMS node(s) 700 may also include additional storage devices. Such additional storage may include removable storage 706 and/or non-removable storage 708.

The IMS node(s) 700 may further include input devices 710 and output devices 712 communicatively to the processor(s) 702 and the computer-readable memory 704. The IMS node(s) 700 may further include communications interface(s) 714 that allow the IMS node(s) 700 to communicate with other network/computing devices 716 such as via a network. The communications interface(s) 714 may facilitate transmitting and receiving wired and/or wireless signals over any suitable communications/data technology, standard, or protocol, as described herein. For example, the communications interface(s) 714 can comprise a SIP (ISC) interface configured to transmit SIP traffic/signaling to the other network/computing devices 716. As another example, the communications interface(s) 714 can comprise a Diameter (Cx) interface configured to transmit messages and data to/from the other network/computing devices 716 using Diameter protocol. In this scenario, the HSS 108 is typically involved in such communication, whether the HSS 108 is the IMS node 700, or the other network/computing device 716.

In various embodiments, the computer-readable memory 704 comprises non-transitory computer-readable memory 704 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 704 may also be described as computer storage media and may include volatile and nonvolatile, removable and non-removable media implemented in any method or technology for storage of information, such as computer readable instructions, data structures, program modules, or other data. Computer-readable memory 704, removable storage 706 and non-removable storage 708 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the IMS node(s) 700. Any such computer-readable storage media may be part of the IMS node(s) 700.

The memory 704 can include computer-executable instructions 718 (or logic 718) that, when executed, by the processor(s) 702 perform the various acts and/or processes disclosed herein. For example, when the IMS node 700 represents the P-CSCF node 102, the instructions/logic 718 can comprise route advance logic to select a second S-CSCF node 202 in the event that a first S-CSCF node 104 becomes unavailable. As another example, when the IMS node 700 represents an S-CSCF node (e.g., the first S-CSCF node 104 or the second S-CSCF node 202), the instructions/logic 718 can comprise route advance logic to select a second AS 302 in the event that a first AS 106 becomes unavailable, as well as logic to send SAR messages 204 and UDR messages 210 to the HSS 108 using Diameter protocol, and logic to receive SAA messages 208 and UDA messages 212 from the HSS 108 over a Diameter interface. When the IMS node 700 represents an AS (e.g., the first AS 106 or the second AS 302), the instructions/logic 718 can comprise logic to send UDR messages 214, 304, PUR messages 116, 310, and SNR messages 122 to the HSS 108 using Diameter protocol, and logic to receive UDA messages 216, 306, PUA messages 120, 312, and SAA messages 316 from the HSS 108 over a Diameter interface. The instructions/logic 718 of the IMS node 700 can further comprise logic for transmitting messages and data over the communications interface(s) 714, using any suitable protocol (e.g., SIP, Diameter, etc.).

The memory 704 can also maintain or persist data 720 in any suitable type of data repository, such as a database. For example, the data 720 can represent user profiles including contact bindings in local storage of the IMS node 700. When the IMS node(s) 700 represents the HSS 108, the data 720 can include the AVPs 114 (including the active AS name AVP 114(1) and the user registration data AVP 114(2)) the HSS 108 receives during registration procedures for UEs, such as the UE 100. The data 720 can also include identifiers (e.g., FQDNs, IP addresses, etc.) for the IMS node 700 that can be inserted into message headers when routing SIP traffic to other nodes in the IMS network.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A method comprising:
sending, from an application server (AS) to a home subscriber server (HSS) for storage at the HSS as part of a registration procedure for a user equipment (UE), an attribute-value pair (AVP) that contains an active AS name identifying the AS as a serving AS for the UE;
receiving, by a proxy call session control function (P-CSCF) node, a Session Initiation Protocol (SIP) request originating from the UE as part of a communication session after the registration procedure;
attempting, by the P-CSCF node, to forward the SIP request to a first serving call session control function (S-CSCF) node that was assigned to the UE as part of the registration procedure;
determining, by the P-CSCF node, that the first S-CSCF node is unavailable in response to the attempting to forward the SIP request to the first S-CSCF node;
selecting, by the P-CSCF node, a second S-CSCF node for the UE;
forwarding, by the P-CSCF node, the SIP request to the second S-CSCF node;
sending, by the second S-CSCF node in response to receipt of the SIP request from the P-CSCF node, a server assignment request (SAR) to the HSS to request restoration information, wherein the SAR causes the HSS to overwrite a first identifier of the first S-CSCF node in an S-CSCF binding for the UE with a second identifier of the second S-CSCF node;
receiving, by the second S-CSCF node, a server assignment answer (SAA) from the HSS that contains the restoration information and indicates to the second S-CSCF node that the second S-CSCF node was not originally assigned to the UE as part of the registration procedure;
in response to receipt of the SAA that indicates that the second S-CSCF node was not originally assigned to the UE as part of the registration procedure, sending, by the second S-CSCF node to the HSS, a user data request (UDR) to request the active AS name previously provided to the HSS by the AS during the registration procedure for the UE;
receiving, by the second S-CSCF node from the HSS, a user data answer (UDA) that indicates the active AS name; and
forwarding, by the second S-CSCF node, the SIP request to the AS identified by the active AS name as the serving AS for the UE,
wherein upon receipt of the SAA, the second S-CSCF node does not have an AS mapping indicating that the SIP request is to be forwarded to the serving AS, and
wherein the second S-CSCF node sends the UDR in response to receipt of the SAA to request the active AS name identifying the serving AS from the HSS.

2. The method of claim 1, further comprising:
receiving, by the AS, the SIP request from the second S-CSCF node; and
contacting, by the AS, the HSS to confirm that the S-CSCF binding includes the second identifier of the second S-CSCF node.

3. The method of claim 2, further comprising updating, at the AS, a user profile, stored locally at the AS for the UE, with a mapping between the UE and the second S-CSCF node.

4. The method of claim 1, wherein the AS also sent a second AVP to the HSS that contained user registration data during the registration procedure for the UE, the method further comprising:
in response to forwarding the SIP request to the AS, determining, by the second S-CSCF node, that the AS is unavailable;
selecting, by the second S-CSCF node, a second AS;
sending, by the second S-CSCF node, the SIP request to the second AS;
sending, by the second AS to the HSS, a second UDR to request the user registration data;
receiving, by the second AS from the HSS, a second UDA containing the user registration data; and
creating, by the second AS and based at least in part on the user registration data, a user profile associated with the UE specifying an association between the UE and the second AS.

5. The method of claim 4, further comprising sending, from the second AS, an updated value for the active AS name to the HSS for storage at the HSS, the updated value for the active AS name identifying the second AS as the serving AS for the UE.

6. The method of claim 5, further comprising sending, from the HSS to the AS, an instruction to delete a local user profile at the AS, the local user profile at the AS specifying an association between the UE and the AS.

7. A system comprising:
a proxy call session control function (P-CSCF) node configured to:
  receive, via a communications interface of the P-CSCF node, a Session Initiation Protocol (SIP) request originating from a user equipment (UE) as part of a communication session after a registration procedure;
  attempt to forward, via the communication interface, the SIP request to a first serving call session control function (S-CSCF) node that was assigned to the UE during the registration procedure;
  determine, based at least in part on a lack of response to the SIP request, or a negative response to the SIP request, from the first S-CSCF node, that the first S-CSCF node is unavailable;
  select, by executing computer-executable instructions stored in memory of the P-CSCF node, a second S-CSCF node for the UE; and
  forward, via the communications interface of the P-CSCF node, the SIP request to the second S-CSCF node; and
the second S-CSCF node configured to:
  send, via a second communications interface of the second S-CSCF node to a home subscriber server (HSS) in response to receipt of the SIP request from the P-CSCF node, a server assignment request (SAR) to request restoration information, wherein the SAR causes the HSS to overwrite a first identifier of the first S-CSCF node in an S-CSCF binding for the UE with a second identifier of the second S-CSCF node;
  receive, via the second communications interface, a server assignment answer (SAA) from the HSS that contains the restoration information and indicates to the second S-CSCF node that the second S-CSCF node was not originally assigned to the UE as part of the registration procedure;
  in response to receipt of the SAA that indicates that the second S-CSCF node was not originally assigned to the UE as part of the registration procedure, send, via the second communications interface to the HSS, a user data request (UDR) to request an active application server (AS) name identifying a serving AS previously assigned to the UE during the registration procedure;
  receive, via the second communications interface from the HSS, a user data answer (UDA) that indicates the active AS name; and
  forward, via the second communications interface, the SIP request to the serving AS based on the active AS name,
wherein upon receipt of the SAA, the second S-CSCF node does not have an AS mapping indicating that the SIP request is to be forwarded to the serving AS, and
wherein the second S-CSCF node sends the UDR in response to receipt of the SAA to request the active AS name identifying the serving AS from the HSS.

8. The system of claim 7, wherein the active AS name comprises a SIP Uniform Resource Identifier (URI).

9. The system of claim 7, wherein the second S-CSCF node is further configured to:
  determine, in response to forwarding the SIP request to the serving AS, that the serving AS is unavailable;
  select, by executing computer-executable instructions stored in memory of the second S-CSCF node, a second AS; and
  send, via the second communications interface, the SIP request to the second AS;
the system further comprising the second AS, the second AS being configured to:
  send, via a third communications interface of the second AS to the HSS, a second UDR to request user registration data associated with the UE that was previously provided to the HSS by the serving AS during the registration procedure for the UE;
  receive, via the third communications interface of the second AS from the HSS, a second UDA containing the user registration data; and
  create, by executing computer-executable instructions stored in memory of the second AS, and based at least in part on the user registration data, a user profile associated with the UE that specifies an association between the UE and the second AS.

10. The system of claim 9, wherein the second AS is further configured to send, via the third communications interface of the second AS to the HSS, an updated value for the active AS name for storage at the HSS to identify the second AS as a new serving AS for the UE.

11. A method comprising:
  receiving, by a serving call session control function (S-CSCF) node, a Session Initiation Protocol (SIP) request from a proxy call session control function (P-CSCF) node that originated from a UE as part of a communication session after a registration procedure for the UE;
  sending, by the S-CSCF node in response to receipt of the SIP request from the P-CSCF node, a server assignment request (SAR) to a home subscriber server (HSS) to request restoration information, wherein the SAR causes the HSS to overwrite a first identifier of an other S-CSCF node that was previously assigned to the UE in an S-CSCF binding for the UE with a second identifier of the S-CSCF node;
  receiving, by the S-CSCF node, a server assignment answer (SAA) from the HSS that contains the restoration information and indicates to the S-CSCF node that the S-CSCF node was not originally assigned to the UE as part of the registration procedure for the UE;
  in response to receipt of the SAA that indicates that the S-CSCF node was not originally assigned to the UE as part of the registration procedure, sending, by the S-CSCF node to the HSS, a user data request (UDR) to request an active application server (AS) name identifying a serving AS previously assigned to the UE during the registration procedure;
  receiving, by the S-CSCF node from the HSS, a user data answer (UDA) that indicates the active AS name; and
  forwarding, by the S-CSCF node, the SIP request to the serving AS based on the active AS name,
wherein upon receipt of the SAA, the S-CSCF node does not have an AS mapping indicating that the SIP request is to be forwarded to the serving AS, and
wherein the S-CSCF node sends the UDR in response to receipt of the SAA to request the active AS name identifying the serving AS from the HSS.

12. The method of claim 1, wherein selecting the second S-CSCF node is performed by the P-CSCF node selecting a predefined S-CSCF node by default, or by the P-CSCF node issuing a domain name system (DNS) query that returns an available S-CSCF node from a pool of available S-CSCF nodes.

13. The method of claim 11, wherein the serving AS sent the active AS name and user registration data to the HSS during the registration procedure for the UE, the method further comprising:
   in response to forwarding the SIP request to the AS, determining, by the S-CSCF node, that the serving AS is unavailable;
   selecting, by the S-CSCF node, a second AS;
   sending, by the S-CSCF node, the SIP request to the second AS;
   sending, by the second AS to the HSS, a second UDR to request the user registration data;
   receiving, by the second AS from the HSS, a second UDA containing the user registration data; and
   creating, by the second AS and based at least in part on the user registration data, a user profile associated with the UE that specifies an association between the UE and the second AS.

14. The method of claim 13, further comprising sending, from the second AS, an updated value for the active AS name to the HSS for storage at the HSS, the updated value for the active AS name identifying the second AS as a new serving AS for the UE.

15. The method of claim 14, further comprising sending, from the HSS to the serving AS, an instruction to delete a local user profile at the serving AS, the local user profile at the serving AS specifying an association between the UE and the serving AS.

16. The method of claim 1, wherein the AS sends the AVP that contains the active AS name to the HSS as part of the registration procedure in a profile update request (PUR) message.

17. The method of claim 11, wherein the S-CSCF node forwards the SIP request to the serving AS to attempt to restore the communication session without tearing down the communication session.

18. The method of claim 1, wherein the second S-CSCF node forwards the SIP request to the AS to attempt to restore the communication session without tearing down the communication session.

19. The system of claim 7, wherein the second S-CSCF node forwards the SIP request to the serving AS to attempt to restore the communication session without tearing down the communication session.

20. The system of claim 7, wherein the P-CSCF node is configured to select the second S-CSCF node by selecting a predefined S-CSCF node by default, or by issuing a domain name system (DNS) query that returns an available S-CSCF node from a pool of available S-CSCF nodes.

* * * * *